US006585308B2

(12) United States Patent
Sturt et al.

(10) Patent No.: US 6,585,308 B2
(45) Date of Patent: Jul. 1, 2003

(54) VISOR ASSEMBLY WITH EXTENDER BLADE

(75) Inventors: Alan Sturt, West Bloomfield, MI (US); Nicholas Alfano, White Lake, MI (US); Matthew R. Mowers, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/037,072

(22) Filed: Nov. 9, 2001

(65) Prior Publication Data

US 2002/0190537 A1 Dec. 19, 2002

(Under 37 CFR 1.47)

Related U.S. Application Data

(60) Provisional application No. 60/247,472, filed on Nov. 9, 2000.

(51) Int. Cl.$^7$ .................................................. B60J 3/00
(52) U.S. Cl. ..................................................... 296/97.8
(58) Field of Search ............................... 296/97.1, 97.6, 296/97.5, 97.8, 97.11

(56) References Cited

U.S. PATENT DOCUMENTS

| 2,432,674 A | 12/1947 | Office |
| 2,596,873 A | 5/1952 | Solmes |
| 2,667,222 A | 1/1954 | McCarthy et al. |
| 2,948,566 A | 8/1960 | Massey |
| 3,649,068 A | 3/1972 | Moynihan |
| 4,264,100 A | 4/1981 | Keeler, II |
| 4,323,275 A | 4/1982 | Lutz |
| D281,413 S | 11/1985 | Prince Corporation et al. |
| 4,792,176 A | 12/1988 | Karford |
| 4,810,023 A | 3/1989 | Kawada |
| 4,828,314 A | 5/1989 | Gavagan |
| 5,005,895 A | 4/1991 | Muyres et al. |
| 5,031,950 A | 7/1991 | Miller |
| 5,042,867 A | 8/1991 | Crotty, III et al. |
| 5,306,065 A * | 4/1994 | Ades ........................... 296/97.8 |
| 5,316,361 A * | 5/1994 | Miller ........................ 296/97.8 |
| 5,417,466 A | 5/1995 | Giantonio et al. |
| 5,431,473 A | 7/1995 | Hiemstra |
| 5,749,618 A | 5/1998 | Jones |
| 5,887,933 A | 3/1999 | Peterson |
| 5,964,494 A | 10/1999 | Miller |
| 5,984,398 A | 11/1999 | Crotty, III |
| 6,062,627 A * | 5/2000 | Murdock ..................... 296/97.9 |
| 6,189,949 B1 * | 2/2001 | Miller et al. ................ 296/97.8 |

* cited by examiner

Primary Examiner—D. Glenn Dayoan
Assistant Examiner—Jason Morrow
(74) Attorney, Agent, or Firm—Bill C. Panagos

(57) ABSTRACT

A visor assembly for a passenger compartment of a vehicle having a visor housing and an extender blade received within the visor housing movable between a retracted position and a extended position. The visor housing includes at least one lower receiving member provided on the inner surface of the housing having an upper portion supporting a bottom surface of the extender blade and a stop limiting the inward travel of the blade through the cavity in the housing. At least one upper receiving member disposed in the inner surface of the visor housing includes a lower portion engaging the top surface of the extender blade to support and guide the extender blade through the aperture in the housing.

17 Claims, 4 Drawing Sheets

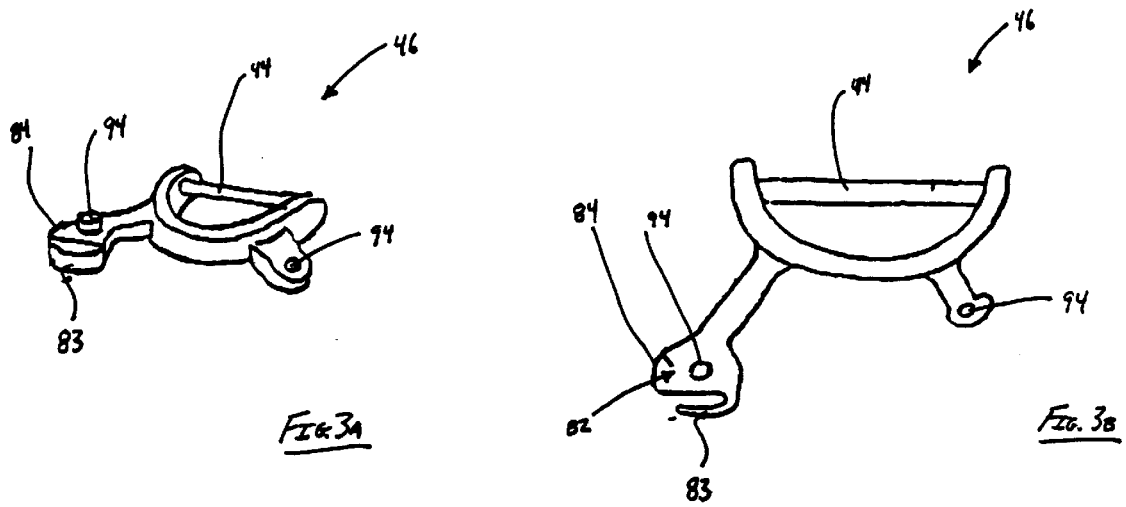
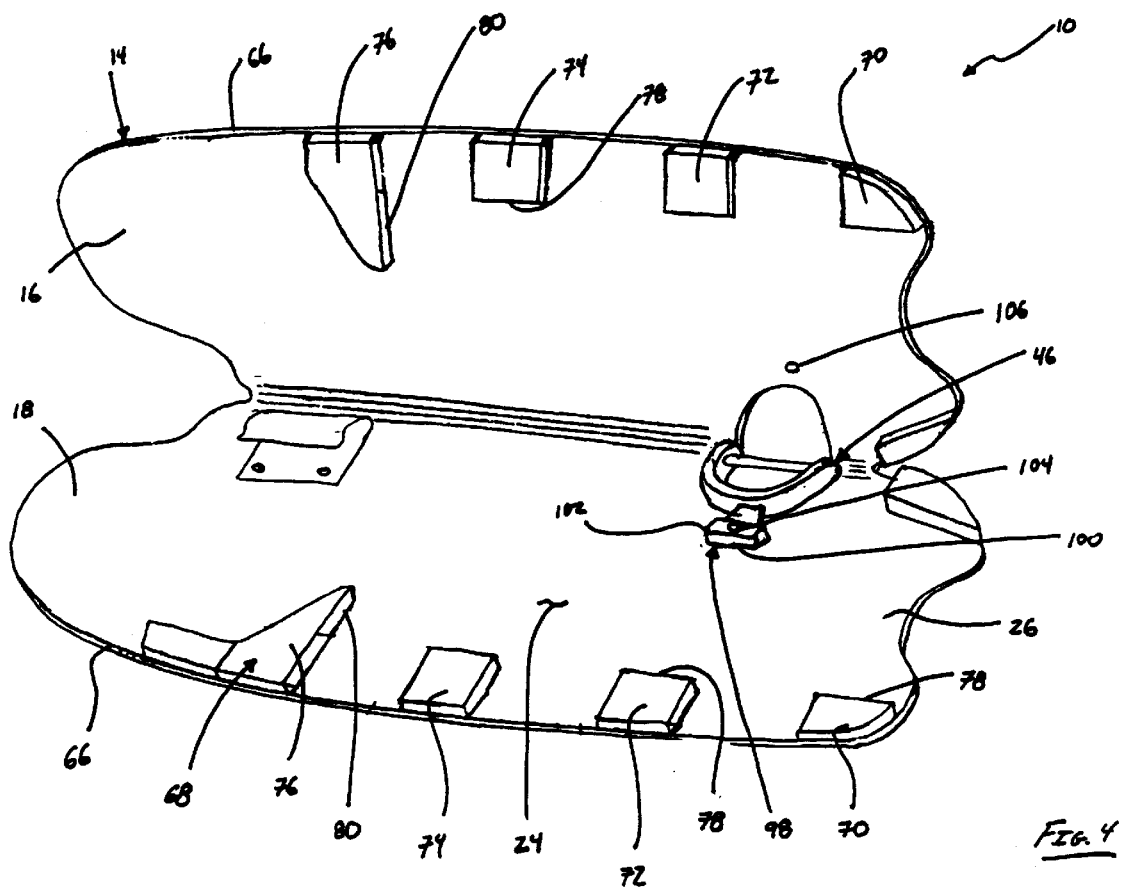

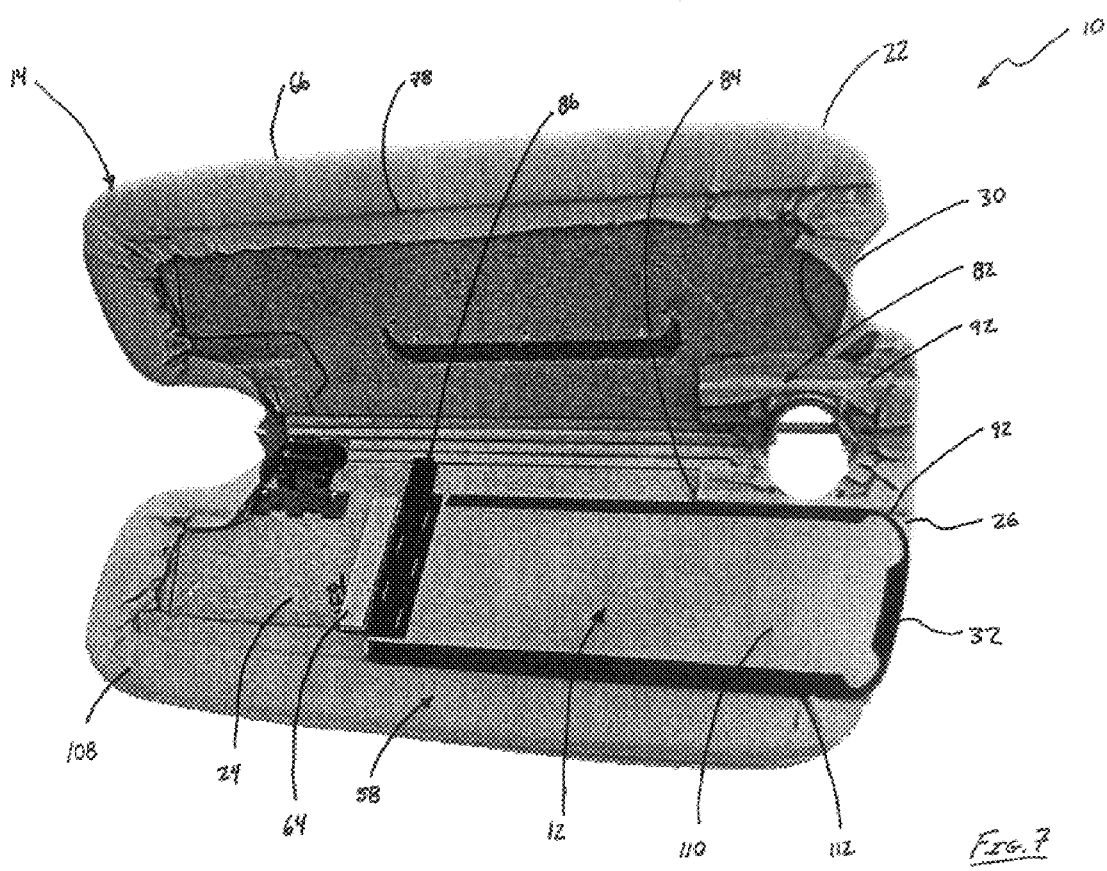

VISOR ASSEMBLY WITH EXTENDER BLADE

CROSS-REFERENCE TO RELATED APPLICATIONS

This application claims the benefit of U.S. provisional application Serial No. 60/247,472 filed Nov. 9, 2000.

BACKGROUND OF THE INVENTION

1. Field of the Invention

The present invention relates to a visor assembly for a vehicle having a selectively positionable extender blade.

2. Background Art

Sun visors are provided in vehicles to shield an occupant's eyes from sunlight or glare from an alternative light source. Visors are pivotally mounted to an overhead roof structure of a vehicle to shield the occupant's vision from light entering through the window or windshield of the vehicle. Most conventional sun visors are constructed with fixed dimensions to provide a glare shield for the occupant. However, conventional visors do not cover the entire window or windshield, allowing light to enter around the outer perimeter of the sun visor, obstructing the occupant's vision.

Sun visor manufacturers have incorporated an extender blade into the visor assembly to provide greater glare protection for the occupants of the vehicle. Extender blades are either provided as an attachment mounted to the outer periphery of the sun visor, or alternatively, are received within the sun visor housing. The extender blades are positionable between a stored position aligned or received within the visor and a deployed position wherein the blade extends away from the visor to a position adjacent a vehicle window or windshield.

Typically, sun visors are formed of a pair of housing members joined together about their respective outer peripheries to create a channel therebetween. An aperture is provided in the outer periphery of the visor housing which cooperates with the channel to receive the extender blade. In order to mount the extender blade within the sun visor assembly, prior art sun visor assemblies required extensive modifications to the inner periphery of the sun visor housing. For example, a series of fasteners or rails must either be attached to or formed on the inner surface of each housing member to receive and retain the extender blade. However, these type of mounting arrangements often are complex in design and costly to manufacture.

Further, plastic to plastic contact between the sun visor housing and extender blade produces undesirable operational noise and an unpleasant feel for the user when extending and retracting the extender blade. It is desirable to eliminate the problems associated with the design, manufacture and operation of prior art sun visor assemblies by providing a sun visor assembly having a simple mounting and receiving arrangement for a selectively positionable extender blade.

SUMMARY OF THE INVENTION

The present invention overcomes the above-referenced problems by providing a visor assembly for a passenger compartment of a vehicle having a visor housing and an extender blade received within the visor housing being movable between a retracted position and a extended position. The visor assembly includes a visor housing having a pair of spaced apart walls defining an outer surface, an inner surface and a cavity therebetween. In one aspect of the invention, the pair of spaced apart walls are formed as a single clamshell housing having a common axis which the pair of spaced apart walls are folded about to secure the walls together. In another aspect of the invention, the pair of spaced apart walls are formed as independent structures joined to form the visor housing.

The spaced apart walls define an aperture in the outer surface of the visor housing cooperating with the cavity to receive an extender blade. The extender blade is positionable between a retracted position received within the cavity of the visor housing and a extended position extending away from the outer surface of the visor housing to reduce the amount of light or glare entering into the interior of the vehicle.

At least one lower receiving member is provided on the inner surface of the visor housing to support a bottom surface of the extender blade. A stop extends from an upper portion of the at least one receiving member to limit the inward travel of the extender blade into the inner surface of the visor housing. In one aspect of the invention, the at least one lower receiving member comprises an elongate rail mounted to or integrally formed on the inner wall of at least one of the spaced apart walls. Alternatively, the at least one lower receiving member includes a series of projections mounted to or integrally formed on the inner wall of at least one of the spaced apart walls, wherein the upper portion of each of the projections are aligned to support the lower surface of the extender blade.

At least one upper receiving member is provided on the inner surface of the visor housing adjacent a top edge to engage and a top surface of the extender blade. A stop is formed on the at least one upper receiving member to engage a portion of the extender blade to limit the outward travel of the extender blade from the visor housing. In one aspect of the invention, the at least one upper receiving member comprises a pair of arms extending away from the lower end of a D-ring of the visor housing. Each of the pair of arms includes a lower surface extending generally parallel to the at least one lower receiving surface to engage the upper surface of the extender blade. The pair of arms are mounted to or integrally formed as part of the D-ring of the visor housing. In another aspect of the invention, a single projection is connected to or formed as part of the D-ring to engage and retain the upper surface of the extender blade. A spring member extending from a lower portion of the at least one upper receiving member biases against the top surface of the extender blade to retain the blade within the inner surface of the visor housing and to guide the blade between the retracted and extended positions.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 3a is a perspective view of one aspect of an upper receiving member of the visor assembly of the present invention; and FIG. 3b is a front plan view of the upper receiving member of the visor assembly;

FIG. 4 is a perspective view of an alternative embodiment of the visor assembly of the present invention;

FIG. 7 is a perspective view of the visor assembly of the present invention with the extender blade in the retracted position.

DETAILED DESCRIPTION OF THE PREFERRED EMBODIMENT

Figure 1:
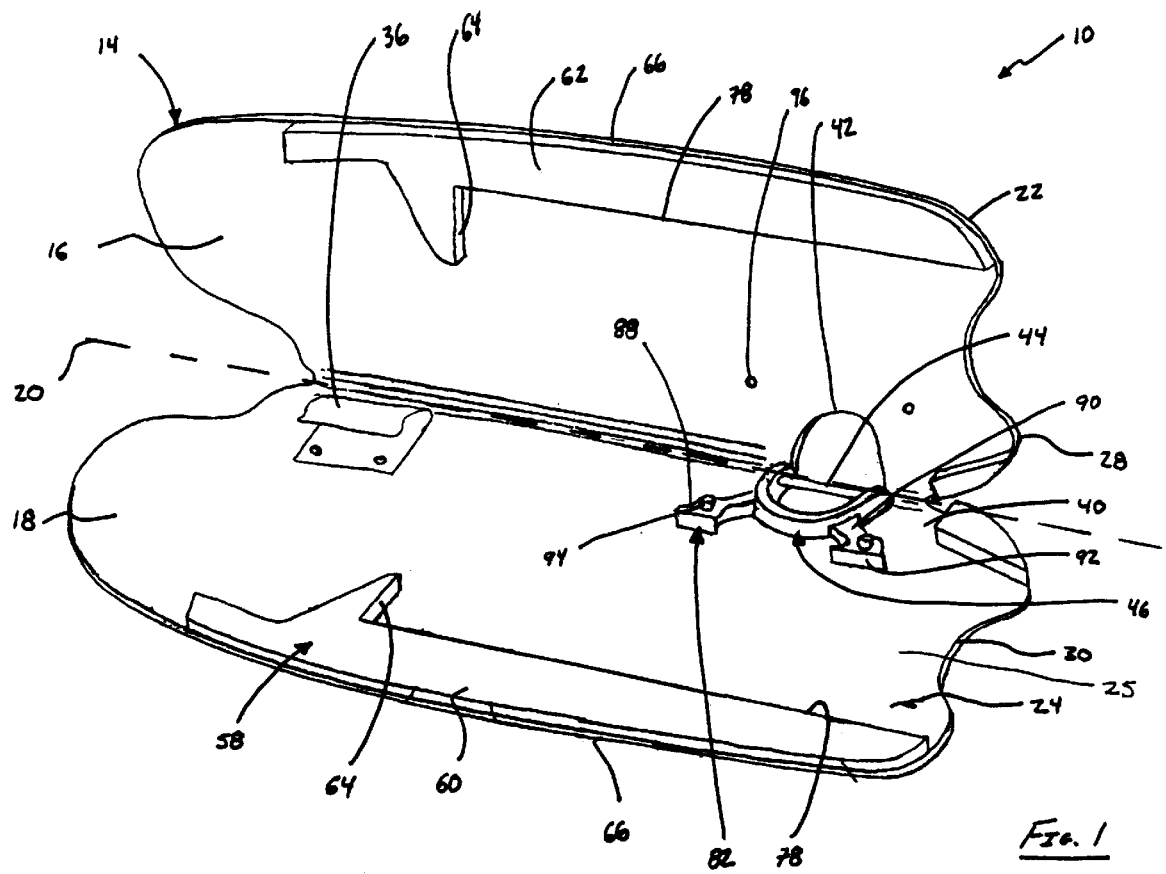
FIG. 1 is a perspective view of the visor assembly of the present invention.

Referring now to the Figures, a visor assembly 10 having a selectively positionable extender blade 12 for the passenger compartment of a vehicle is illustrated. FIG. 1 shows a visor housing 14 having a pair of spaced apart walls 16, 18 joined about a common central axis 20. The spaced apart walls 16, 18 define an outer surface or periphery 22 of the visor housing 14 and an inner surface or periphery 24. The inner surface 24 defines a cavity 25 between walls 16, 18. The pair of spaced apart walls 16, 18 may be constructed from two opposing structural pieces or as a one-piece plastic clamshell housing about the common central axis 20. Alternatively, the housing 14 may be formed as a one or two piece structure from laminated paper board or other flat sheet product.

The pair of spaced apart walls 16, 18 are assembled together by folding the inner surfaces of each wall towards one another about the central axis 20 to create visor housing 14. Alternatively, the pair of spaced apart walls 16, 18 are formed as independent structures which are connected to one another by fasteners or secured together by a bonding process, such as adhesive bonding or vibration welding, to form the visor housing 14.

An aperture 26 is defined between the spaced apart walls 16, 18 in the outer surface 22 of visor housing 14. Aperture 26 is formed along an edge 28 of the visor housing 14. Aperture 26 cooperates with the cavity 25 to receive extender blade 12. A curved or scalloped edge portion 30 is formed in the vertical edge 28 of spaced apart walls 16, 18 corresponding to the aperture 26. In a preferred embodiment of the invention, aperture 26 is provided in a vertical edge 28 of a side of visor housing 14 to allow the extender blade to be extended and retracted horizontally relative to the visor housing 14. It is also understood that aperture 26 may also be provided along a horizontal edge of the visor housing 14 if the extender blade is translated vertically relative to visor housing 14.

A bracket 36 is mounted to the inner surface 24 of one of the spaced apart walls 16, 18 adjacent a top edge 40 extending along common axis 20. Bracket 36 receives a mounting arm (not shown) extending from the headliner of the vehicle to pivotally secure visor assembly 10 to the headliner. Visor assembly 10 pivots about the mounting arm, allowing an occupant of the vehicle to position visor assembly 10 adjacent a door window or the windshield of a vehicle to limit glare or light entering through the window or windshield.

An aperture 42 is formed along the top edge 40 in the spaced apart walls 16, 18 opposite bracket 36. A bar 44 extending generally parallel to the top edge 40 of visor housing 14 within aperture 42 is received in a clamp or fastener on the headliner (not shown) to retain visor assembly 10 in a stored position. A D-ring connector 46 is provided on the visor housing 14 to cooperate with the clamp or fastener on the headliner of the vehicle. Connector 46 may be integrally formed into one of the spaced apart walls 16, 18. Alternatively, connector 46 may be mounted in aperture 42 to complete assembly of the visor housing 14.

Figure 2:
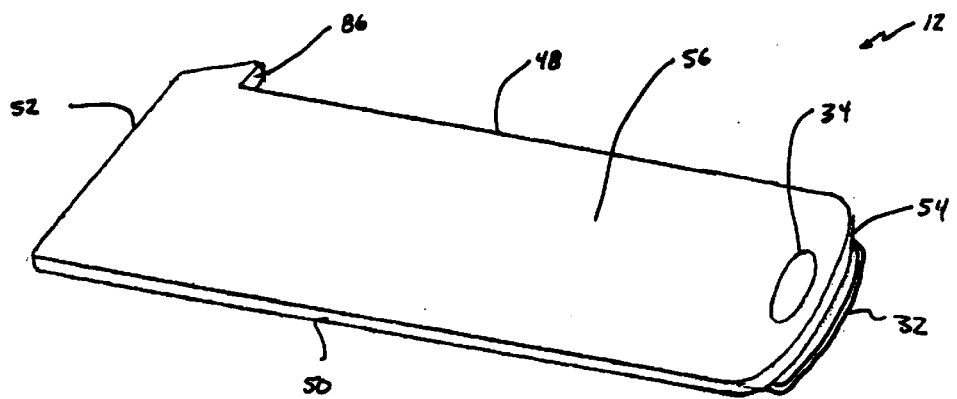
FIG. 2 is a perspective view of an extender blade for the visor assembly of the present invention.

Referring additionally to FIG. 2, extender blade 12 is selectively positionable relative to visor housing to decrease the amount of light or glare entering the interior of a vehicle through a window or windshield. Extender blade 12 is preferably formed from a molded plastic material as a rectangular plate having a top surface 48, a bottom surface 50 and longitudinal side surfaces 52, 54. However, it is easily understood that different types of materials and geometries may be used to create the extender blade 12. A handle 32 and indentation 34 are formed on opposing face surfaces 56 of extender blade 12. Curved portion 30 of the outer surface 22 of visor housing 14 provides access to handle 32 or indentation 34 on extender blade 12. Handle 32 and indentation 34 assist an occupant in extending or retracting blade in visor assembly 10.

A cover material, such as a polymeric coverstock fabric or the like, is placed about the outer surface of both extender blade 12 and visor housing. For purposes of simplicity, cover material is not shown in FIGS. 1–4 on either extender blade 12 or visor housing 14. The cover material additionally extends through aperture 26 into inner surface 24 of visor housing 14. The use of cover material on both extender blade 12 and visor housing 14 not only provides an aesthetically pleasing outer appearance, but also decreases the operational noise and amount of friction caused by the adjustment of the extender blade 12 relative to the visor housing 14.

Referring back to FIG. 1, at least one lower receiving member 58 is provided on the inner surface 24 of at least one of the spaced apart walls 16, 18 of the visor housing 14 to support the bottom surface 50 of the extender blade 12. In one aspect of the present invention, a pair of lower receiving members 60, 62 are mounted on the inner surface 24 of each of the spaced apart walls 16, 18. Each of the lower receiving members 60, 62 is formed as a unitary elongate rail disposed adjacent a bottom horizontal edge 66 of visor housing 14.

When the pair of spaced apart walls are assembled together, the pair of lower receiving members 60, 62 are aligned such that an upper portion 78 of each of the receiving members 60, 62 supports the bottom surface 50 of extender blade 12. A stop 64 extends upward from each of the pair of lower receiving members 60, 62 toward the top edge 40 of visor housing 14. Stop 64 limits the inward travel or retraction of the extender blade 12 into the cavity 25 defined by the inner surface 24 of the visor housing 14 by engaging a longitudinal side surface 54 of extender blade 12.

In a preferred embodiment of the invention, lower receiving members 60, 62 are formed as separate elongate rails die cut to a thickness of about 3 to 5 millimeters which are bonded to the inner surface 24 of spaced apart walls 16, 18. When the spaced apart walls 16, 18 are folded about common central longitudinal axis 20, lower receiving members 60, 62 are disposed adjacent to and aligned with one another to create a unitary upper portion 78 to support the bottom surface 50 of extender blade 12. Alternatively, lower receiving members 60, 62 may be integrally formed as part of the visor housing 14 on the inner surface 24 of the spaced apart walls 16, 18 and hinged around a scored line at top edge 40. It is also understood that visor assembly 10 may include only one lower receiving member 58, cut to a wider thickness and mounted to one of the spaced apart walls 16, 18 to support extender blade 12.

As is shown in FIG. 4, a second aspect of the invention includes a visor housing 14 having at least one lower receiving member 68 provided on the bottom horizontal edge 66 of the visor housing. The at least one lower receiving member 68 includes a series of projections 70, 72, 74, 76 provided on the inner surface 24 of the spaced apart walls 16, 18. Projections 70 are formed adjacent aperture 26 in visor housing 14 and include an upper portion 78 to guide the bottom surface 50 of extender blade 12. Projections 70 are attached to the front edge of each spaced apart wall 16, 18 to form a unitary support surface when spaced apart walls 16, 18 are aligned to form visor housing 14.

Projections 72, 74, 76 each include an upper portion 78 which is aligned with the upper portion 78 of projection 70 to support the bottom surface 50 of the extender blade 12. Preferably, a cover material is disposed on the upper portion 78 of each of projections 70, 72, 74, 76 to decrease the surface to surface friction between the upper portion 78 and the bottom surface 50 of extender blade 12. Projection 76 includes a stop 80 extending above the plane formed by the upper portions 78 of projections 70, 72, 74. Stop 80 limits the inward travel of extender blade 12 by engaging the longitudinal side surface 54 of extender blade 12.

In a preferred embodiment, projections 70, 72, 74, 76 are integrally formed on the inner surface 24 of both spaced apart walls 16, 18. Projections 70, 72, 74, 76 may also be bonded or adhered to the inner surface 24 of spaced apart walls 16, 18. Projections 70, 72, 74, 76 may be provided on the inner surface 24 of only one of the spaced apart walls 16, 18 to from a unitary upper portion 78 to support the bottom surface 50 of extender blade 12. Alternatively, projections 72, 74, 76 are formed in an alternating pattern on each wall 16, 18 such that projections 72, 74, 76 form a unitary upper portion 78 when spaced apart walls 16, 18 are assembled to form a visor housing 14. In this arrangement, projections 72, 74, 76 have a greater thickness than split projection 70 formed on each wall 16, 18 to create the unitary upper portion 78.

In another aspect of the invention, projections 70, 72, 74, 76 form a continuous upper portion 78 to provide a smooth sliding surface for the bottom surface 50 of extender blade 12. Projections 70 are provided on the front edge of each spaced apart wall 16, 18 to form a unitary receiving surface at the front edge of aperture 26. Projections 72, 74, 76 are formed in an alternating pattern on the inner surface 24 of each spaced apart wall 16, 18. When the bottom horizontal edge 66 of each spaced apart wall 16, 18 is brought into alignment during the visor housing assembly process, projections 72, 74, 76 interlock to form a substantially planar unitary upper portion 78 to receive extender blade 12.

Referring now to FIGS. 3a and 3b, D-ring connector 46 of visor assembly 10 includes at least one upper receiving member 82 disposed on the inner surface 24 of one of the spaced apart walls 16, 18 of the visor housing 14. The at least one receiving member 82 engages top surface 48 of the extender blade 12. A stop 84 is provided on the at least one upper receiving member 82 to engage a portion 86 of the extender blade 12 to limit the outward travel or extension of the extender blade 12 relative to the visor housing 14. In a preferred embodiment of the present invention, upper receiving member 82 includes a spring element 83 attached to a bottom surface of upper receiving member 82. Spring element 83 engages top surface 48 of extender blade 12 to limit the upward travel of extender blade 12 by reducing the upper limit tolerance by about 1 to 2 millimeters.

In a preferred embodiment of the invention shown in FIG. 1, the at least one upper receiving member 82 comprises a pair of arms 88, 90 extending away from the lower end of D-ring connector 46. Each of the pair of arms 88, 90 of upper receiving member 82 include a bottom surface 92 which extends generally parallel to the upper portion 78 of the at least one lower receiving member 58. Bottom surface 92 combines with upper portion 78 of the at least one lower receiving member 58 to limit the movement of the extender blade 12 within cavity 25 of visor housing 14 and guide blade 12 between a retracted position illustrated in FIG. 5 and a extended position illustrated in FIG. 6.

In one aspect of the invention, D-ring connector 46 is formed in spaced apart wall 18. The pair of arms 88, 90 of the at least one upper receiving member 82 are integrally formed in the lower end the D-ring connector 46. A peg 94 is formed on each arm 88, 90 of the at least one upper receiving member 82 and engages a corresponding hole 96 formed in spaced apart wall 16 to interconnect the spaced apart walls 16, 18. Alternatively, arms of the at least one upper receiving member 82 may be formed as separate pieces which are bonded or adhered to the lower end of the D-ring connector 46.

In another aspect of the invention illustrated in FIG. 4, a single upper receiving member 98 is connected to or formed as part of the D-ring connector 46 mounted to wall 16 of visor housing 14 to engage the top surface 48 of the extender blade 12. Upper receiving member 98 includes a lower surface 100 extending generally parallel to the upper portion 78 of the at least one lower receiving member 58. A stop 102 is formed on upper receiving member 98 to engage portion 86 of extender blade 12 to limit the outward travel or extension of the extender blade 12. A peg 104 is provided on the upper receiving member 98 and engages a hole 106 in a corresponding spaced apart wall 18 to assemble walls 16, 18 together.

Figure 5:
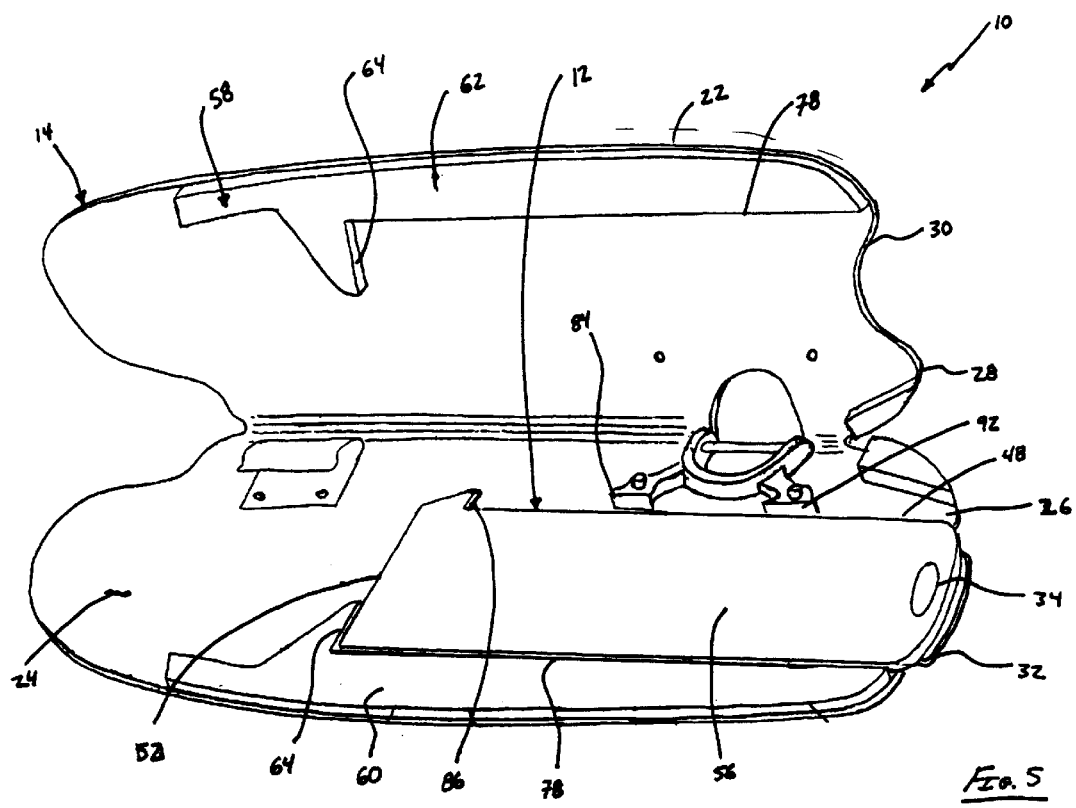
FIG. 5 is a perspective view of the visor assembly with the extender blade disposed in a retracted position.
Figure 6:
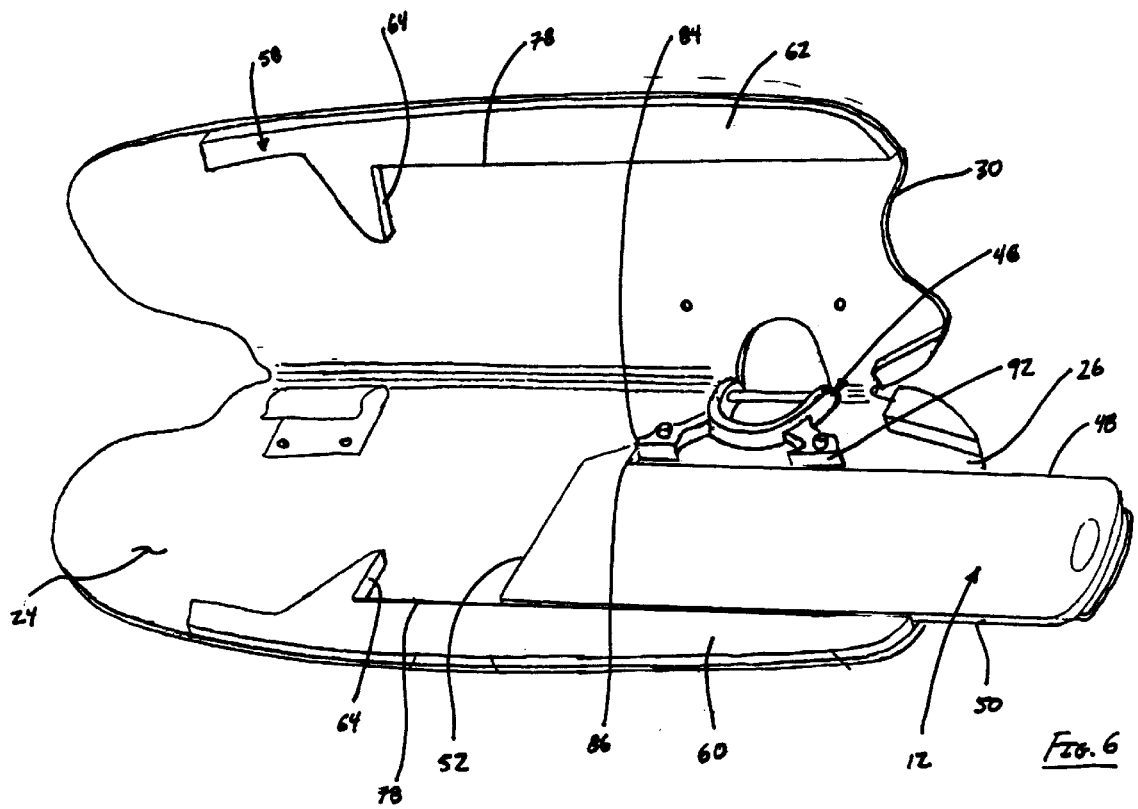
FIG. 6 is a perspective view of the visor assembly with the extender blade in a extended position.

In an illustrative embodiment shown in FIGS. 5–7, the visor assembly 10 with extender blade 12 mounted in visor housing 14 are advantageously used together to provide a simplified visor assembly. In a preferred embodiment of the present invention, a cover material 108 extends over the outer surface 22 of the visor housing 14 and wraps around the bottom edge 66 to cover a portion of the inner surface 24 of the housing 14. End portions of the cover material 108 extend over the upper portion 78 of the at least one receiving member 58 of the visor housing 14 and are secured to the inner surface 24 to provide a friction-resistant sliding surface for extender blade 12. Alternatively, a first cover material may be applied to only the outer surface 22 of the visor housing 14 while a second cover material may be applied to the upper portion 78 of the at least one lower receiving member 58 in the visor housing 14. It is also understood that a cover material may be applied to the lower surface 92 of the at least one upper receiving member 82.

The outer surface of the extender blade 12 may also be wrapped in a cover material 110. Preferably, the cover material 110 wrapped about the extender blade 12 matches the material covering the visor housing 14 to provide an aesthetically pleasing appearance for visor assembly 10. A protective cover 112 may be secured about the outside edges of the outer perimeter of the extender blade 12 to allow the blade 12 to slide along the upper portion 78 of the at least one lower receiving member 58 with little frictional resistance between at least a retracted position, shown in FIG. 5, and an extended position shown in FIG. 6, while reducing noise generated by the movement of extender blade 12.

When the extender blade 12 is in the fully retracted position illustrated in FIG. 5, opposing face surfaces 56 of blade 12 are disposed within the cavity 25 of visor housing 14. Stop 64 of the at least one lower receiving member 58 engages side surface 52 of blade 12 to limit the inward travel of the blade 12 in visor housing 14. Scalloped edge portion 30 of visor housing 14 allows the occupant of the vehicle to easily grab handle 32 or indentation 34 to position the extender blade 12 between the retracted position and an extended position.

When the occupant moves extender blade 12 outward relative to the visor housing 14, the bottom surface 50 of blade 12 slides along the upper portion 78 of the at least one receiving member 58. The lower surface 92 of the at least one upper receiving member 82 engages a top surface 48 of blade 12 to guide the blade through the inner surface 24 and aperture 26 in visor housing 14. Stop 84 on the at least one upper receiving member 82 engages the stop portion 86 on blade 12 to limit the outward travel of the blade 12 through housing 14. Once positioned, blade 12 extends away from visor housing 14 such that face surfaces 56 of blade 12 cooperate with outer surface 22 of the visor housing 14 to limit the amount of light or glare entering through a vehicle window or windshield.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A visor assembly for a vehicle comprising:
   a visor housing having a pair of spaced apart walls defining an outer surface, an inner surface and a cavity defined between the walls, the walls further defining an aperture that cooperates with the cavity of the housing;
   an extender blade extending into the cavity through the aperture in the housing and being movable between a retracted position and an extended position;
   at least one lower receiving member provided proximate a bottom edge of the inner surface of the visor housing, the at least one lower receiving member having an upper portion supporting a bottom surface of the extender blade and a stop extending from the upper portion to limit retraction of the extender blade through the inner surface of the housing; and
   at least one upper receiving member provided adjacent a top edge of the inner surface of the visor housing, the at least one upper receiving member having a lower portion engaging a top surface of the extender blade and a stop limiting extension of the extender blade through the aperture in the housing.

2. The visor assembly of claim 1 wherein the at least one lower receiving member comprises an elongate rail disposed on the bottom edge of the inner surface of one of the pair of spaced apart walls to support the bottom surface of the extender blade.

3. The visor assembly of claim 1 wherein the at least one lower receiving member comprises a pair of elongate rails disposed on the bottom edge of each of the pair of spaced apart walls, wherein the pair of elongate rails cooperate to support the bottom surface of the extender blade.

4. The visor assembly of claim 1 wherein the at least one lower receiving member comprises projections formed on each of the pair of spaced apart walls cooperating to support the bottom surface of the extender blade.

5. The visor assembly of claim 1 wherein the at least one lower receiving member is integrally formed in the bottom edge of at least one of the pair of spaced apart walls.

6. The visor assembly of claim 1 wherein the at least one upper receiving member comprises at least one arm extending from a top edge of one of the spaced apart walls of visor housing.

7. The visor assembly of claim 6 wherein the at least one upper receiving member comprises an arm extending from a top edge of one of the pair of spaced apart walls of the visor housing to engage a top surface of the extender blade.

8. The visor assembly of claim 6 wherein the at least one upper receiving member comprises a pair of arms extending from a top edge of one of the pair of spaced apart walls of the visor housing to engage a top surface of the extender blade.

9. The visor assembly of claim 1 wherein the at least one upper receiving member comprises a spring extending from the lower portion of the at least one member to engage the top surface of the extender blade.

10. The visor assembly of claim 1 wherein the extender blade further comprises a portion extending from the top surface of the blade which engages the stop on the at least one upper receiving member to limit the extension of the extender blade through the inner surface of the housing.

11. A visor assembly having an extender blade selectively positionable between a retracted position and an extended position, the visor assembly comprising:
    a visor housing having a pair of spaced apart walls defining an outer surface, an inner surface and a cavity defined between the walls, the walls further defining an aperture that cooperates with the cavity of the housing;
    at least one lower receiving member provided proximate a bottom edge of the inner surface of the visor housing to support the extender blade, the at least one lower receiving member having an upper portion supporting a bottom surface of the extender blade and a stop extending from the upper portion of the at least one receiving member to limit retraction of the extender blade into the cavity in the housing; and
    a pair of upper receiving members integrally formed in one of the pair of spaced apart walls adjacent a top edge of the inner surface of the visor housing, the pair of upper receiving members having a lower portion engaging a top surface of the extender blade and a stop limiting extension of the extender blade through the aperture in the housing.

12. The visor assembly of claim 11 wherein the at least one lower receiving member comprises an elongate rail disposed on the bottom edge of the inner surface of one of the pair of spaced apart walls to support the bottom surface of the extender blade.

13. The visor assembly of claim 11 wherein the at least one lower receiving member comprises a pair of elongate rails disposed on the bottom edge of each of the pair of spaced apart walls, wherein the pair of elongate rails cooperate to support the bottom surface of the extender blade.

14. The visor assembly of claim 11 wherein the at least one lower receiving member comprises projections formed on each of the pair of spaced apart walls cooperating to support the bottom surface of the extender blade.

15. The visor assembly of claim 11 wherein the at least one lower receiving member is integrally formed in the bottom edge of at least one of the pair of spaced apart walls.

16. The visor assembly of claim 11 wherein the one of the pair of upper receiving members includes a spring extending from the lower portion of the member to engage the top surface of the extender blade.

17. An extendable visor assembly comprising:
    a visor housing having a pair of spaced apart walls defining an outer surface, an inner surface and a cavity defined between the inner surface of the walls;
    an aperture formed in the outer surface of the housing cooperating with the inner surface of the housing;

an extender blade extending into the inner surface through the aperture in the housing movable between a retracted position and an extended position;

opposing elongate rails integrally formed on a bottom edge of the inner surface of each of the pair of spaced apart walls of the visor housing, wherein the opposing elongate rails are disposed adjacent one another upon assembly of the visor housing to form a unitary upper portion to support a bottom surface of the extender blade and a stop extending from the upper portion to limit the travel of the extender blade through the cavity in the housing; and an upper receiving member provided adjacent a top edge of the inner surface of the visor housing, the at least one upper receiving member having a lower portion engaging a top surface of the extender blade and a stop engaging a portion extending from the top surface of the blade to limit the travel of the extender blade through the aperture in the housing.

* * * * *